United States Patent
Kim et al.

(10) Patent No.: US 11,463,929 B2
(45) Date of Patent: Oct. 4, 2022

(54) METHOD FOR TRANSMITTING AND RECEIVING SIGNAL RELATED TO HANDOVER FROM 5GS TO EPS IN WIRELESS COMMUNICATION SYSTEM AND DEVICE THEREFOR

(71) Applicant: LG ELECTRONICS INC., Seoul (KR)

(72) Inventors: Laeyoung Kim, Seoul (KR); Hyunsook Kim, Seoul (KR); Jinsook Ryu, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 16/650,831

(22) PCT Filed: Sep. 28, 2018

(86) PCT No.: PCT/KR2018/011517
§ 371 (c)(1),
(2) Date: Mar. 25, 2020

(87) PCT Pub. No.: WO2019/066544
PCT Pub. Date: Apr. 4, 2019

(65) Prior Publication Data
US 2020/0275331 A1 Aug. 27, 2020

Related U.S. Application Data

(60) Provisional application No. 62/565,112, filed on Sep. 29, 2017, provisional application No. 62/564,284, filed on Sep. 28, 2017.

(30) Foreign Application Priority Data

Jul. 24, 2018 (KR) .................... 10-2018-0085850
Jul. 31, 2018 (KR) .................... 10-2018-0089023

(51) Int. Cl.
*H04W 36/14* (2009.01)
*H04W 36/00* (2009.01)

(52) U.S. Cl.
CPC ....... *H04W 36/14* (2013.01); *H04W 36/0033* (2013.01)

(58) Field of Classification Search
CPC ............ H04W 36/14; H04W 36/0022; H04W 28/0268; H04W 36/0033; H04W 36/08; H04W 36/0011
See application file for complete search history.

(56) References Cited

U.S. PATENT DOCUMENTS 8,457,635 B2    6/2013  Bachmann et al.
2017/0339609 A1 * 11/2017  Youn ...................... H04W 76/11
(Continued)

FOREIGN PATENT DOCUMENTS

CN    101267319    9/2008
CN    101374339    2/2009
(Continued)

OTHER PUBLICATIONS

PCT International Application No. PCT/KR2018/011517, Written Opinion of the International Searching Authority dated Jan. 11, 2019, 24 pages.

(Continued)

*Primary Examiner* — Allahyar Kasraian
(74) *Attorney, Agent, or Firm* — Lee Hong Degerman Kang Waimey

(57) ABSTRACT

An embodiment of the present invention relates to a method for an access and mobility management function (AMF) transmitting and receiving a signal related to a handover from 5GS to an evolved packet system (EPS) of a user equipment (UE) in a wireless communication system the method comprising a step in which the AMF receives a (Continued)

handover required message from a next-generation radio access network (NG-RAN); a step in which the AMF requests a session management (SM) context to a packet data network gateway+session management function (PGW+SMF); a step of receiving an SM context from the PGW+SMF; and a step in which the AMF transmits a handover command to the NG-RAN, wherein the SM context request is for a PDU session associated with 3GPP access among a plurality of protocol data unit (PDU) sessions.

12 Claims, 11 Drawing Sheets

(56) References Cited

U.S. PATENT DOCUMENTS

| | | | | |
|---|---|---|---|---|
| 2019/0028961 A1* | 1/2019 | Faccin | | H04W 48/18 |
| 2020/0112522 A1* | 4/2020 | Dannebro | | H04W 36/14 |
| 2020/0137672 A1* | 4/2020 | Rommer | | H04W 76/25 |
| 2020/0170068 A1* | 5/2020 | Thiebaut | | H04W 8/22 |
| 2020/0178196 A1* | 6/2020 | Wang | | H04W 60/005 |

FOREIGN PATENT DOCUMENTS

| | | | | |
|---|---|---|---|---|
| CN | 109391932 A * | 2/2019 | | H04W 8/04 |
| CN | 109392043 A * | 2/2019 | | H04W 36/0022 |
| KR | 101274289 | 6/2013 | | |
| KR | 101752073 | 6/2017 | | |
| WO | WO-2019033269 A1 * | 2/2019 | | H04W 36/14 |

OTHER PUBLICATIONS

China Telecom, "Update 5GS to EPS handover procedure", SA WG2 Meeting #122, S2-174257, Jun. 2017, 5 pages.

Ericsson, "23.502: Handover between 3GPP and non-3GPP access", SA WG2 Meeting #120, S2-171752, Mar. 2017, 8 pages.

European Patent Office Application Serial No. 18861108.1, Office Action dated May 26, 2021, 6 pages.

LG Electronics et al., "TS 23.502: Applicability of handover between 3GPP and N3GPP," SA WG2 Meeting #122bis, S2-175787, Aug. 2017, 12 pages.

The State Intellectual Property Office of the People's Republic of China Application Serial No. 201880063637.1, Office Action dated Jul. 2, 2021, 6 pages.

3rd Generation Partnership Project (3GPP), "Technical Specification Group Services and System Aspects; Procedures for the 5G System; Stage 2 (Release 15)," 3GPP TS 23.502 V1.0.0, Sep. 2017, 166 pages.

LG Electronics et al, "TS 23.502: Applicability of handover between 3GPP and N3GPP," SA WG2 Meeting #122, S2-174589, May 2017, 12 pages.

European Patent Office Application Serial No. 18861108.1, Search Report dated Sep. 22, 2020, 10 pages.

3rd Generation Partnership Project (3GPP), "Technical Specification Group Services and System Aspects; Procedures for the 5G System; Stage 2 (Release 15)", 3GPP TS 23.502 V1.2.0, XP051337115, Sep. 2017, 165 pages.

3rd Generation Partnership Project (3GPP), "Technical Specification Group Services and System Aspects; System Architecture for the 5G System; Stage 2 (Release 15)," 3GPP TS 23.501 V1.0.0, XP009517908, Jun. 2017, 146 pages.

Nokia, et al., "23.502 Section 4.2.3: miscellaneous updates to Section 4.2.3", SA WG2 Meeting #122E e-meeting, S2-176827, XP051359443, Sep. 2017, 15 pages.

Huawei, et al., "TS23.502: update to ATC related procedures", SA WG2 Meeting #122bis, S2-175649, XP051335122, Aug. 2017, 8 pages.

* cited by examiner

METHOD FOR TRANSMITTING AND RECEIVING SIGNAL RELATED TO HANDOVER FROM 5GS TO EPS IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/011517, filed on Sep. 28, 2018, which claims the benefit of earlier filing date and right of priority to U.S. Provisional Application No. 62/564,284, filed on Sep. 28, 2017, 62/565,112, filed on Sep. 29, 2017, and also claims the benefit of Korean Application Nos. 10-2018-0085850, filed on Jul. 24, 2018, and 10-2018-0089023, filed on Jul. 31, 2018, the contents of which are all incorporated by reference herein in their entireties.

TECHNICAL FIELD

The present disclosure relates to a wireless communication system, and more particularly, to a method of transmitting and receiving a signal related to handover from a fifth generation system (5GS) to an evolved packet system (EPS) and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

The present disclosure proposes a method of providing efficient interworking between a third generation partnership project (3GPP) fifth generation (5G) system and an evolved packet system (EPS). In particular, the present disclosure provides a handover method in consideration of both 3GPP and non-3GPP access.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solution

In an aspect of the present disclosure, provided is a method of transmitting and receiving, by an access and mobility management function (AMF), a signal related to handover of a user equipment (UE) from a fifth generation system (5GS) to an evolved packet system (EPS) in a wireless communication system. The method may include: receiving, by the AMF, a Handover Required message from a next generation radio access network (NG-RAN); requesting, by the AMF, a session management (SM) context to a packet data network gateway+session management function (PGW+SMF); receiving the SM context from the PGW+SMF; and transmitting, by the AMF, a handover command to the NG-RAN. In this case, the SM context request may be for a protocol data unit (PDU) session related to a third generation partnership project (3GPP) access among a plurality of PDU sessions.

In another aspect of the present disclosure, provided is an AMF device for transmitting and receiving a signal related to handover of a UE from a 5GS to an EPS in a wireless communication system. The AMF device may include a transceiver and a processor. The processor may be configured to: receive a Handover Required message from an NG-RAN through the transceiver; request an SM context to a PGW+SMF; receive the SM context from the PGW+SMF; and control the AMF to transmit a handover command to the NG-RAN. In this case, the SM context request may be for a PDU session related to a 3GPP access among a plurality of PDU sessions.

In a further aspect of the present disclosure, provided is a method of transmitting and receiving, by a PGW+SMF, a signal related to handover of a UE from a 5GS to an EPS in a wireless communication system. A PGW+SMF device may include a transceiver and a processor. The processor may be configured to receive a request for an SM context from an AMF and transmit the SM context to the AMF. In this case, the SM context request may be for a PDU session related to a 3GPP access among a plurality of PDU sessions.

The SM context request may include a PDU session ID for the PDU session related to the 3GPP access.

The plurality of PDU sessions may include one or more PDU sessions related to 3GPP access and zero or more PDU sessions related to non-3GPP access.

The type of the handover may be handover from the 5GS to an evolved universal mobile telecommunications system (UMTS) terrestrial radio access network (E-UTRAN).

The AMF may store access information for each PDU session.

The PGW+SMF may manage both a 3GPP access PDU session and a non-3GPP access PDU session.

The PDU session ID may be reference information assigned by an SMF during generation of the SM context for the PDU session to identify the PDU session or the SM context.

The received SM context may be for the PDU session corresponding to the PDU session ID.

An access type in the SM context request may be set to the 3GPP access.

Only the PDU session related to the 3GPP access may be handed over to a target access network based on the handover command.

The target access network may be an E-UTRAN.

Advantageous Effects

According to the present disclosure, traffic steering policies/rules, service provider policies, and/or user preferences may be sufficiently reflected.

It will be appreciated by persons skilled in the art that the effects that can be achieved with the present disclosure are not limited to what has been particularly described herein-above and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
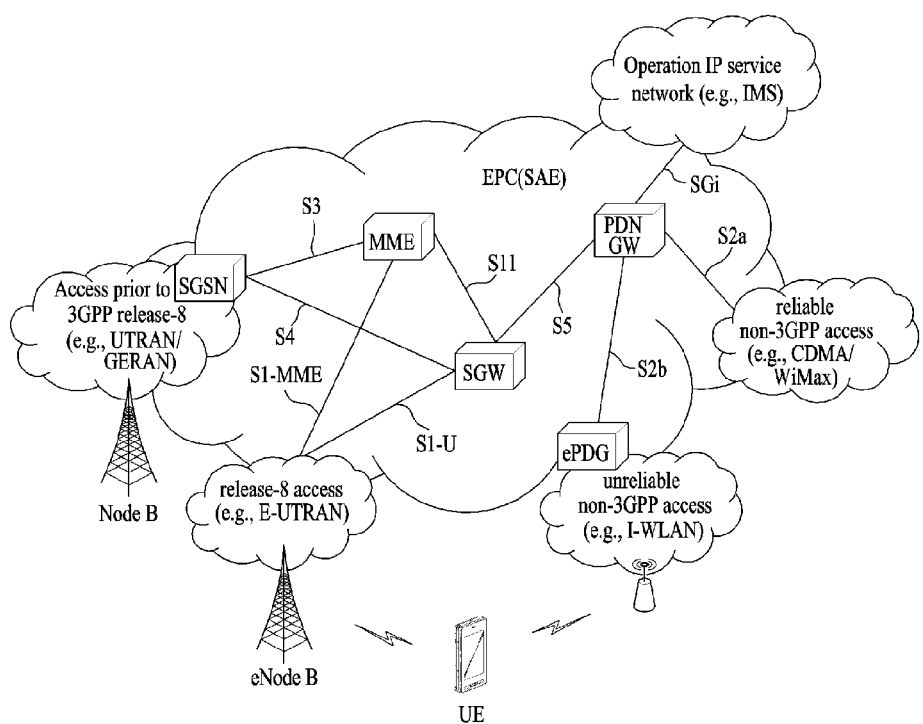
FIG. 1 is a schematic diagram illustrating the structure of an evolved packet system (EPS) including an evolved packet core (EPC).

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |

TABLE 1-continued

| Reference point | Description |
|---|---|
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP access. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
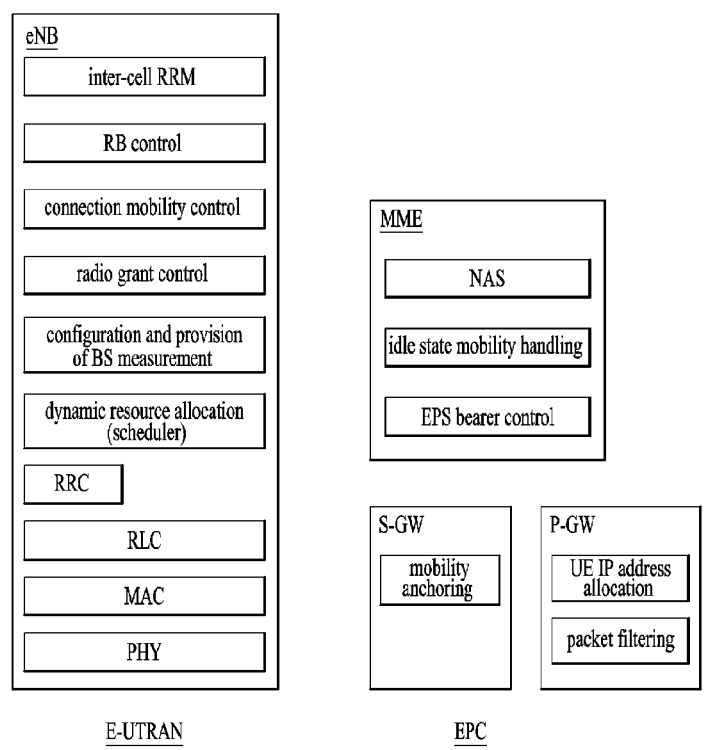
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
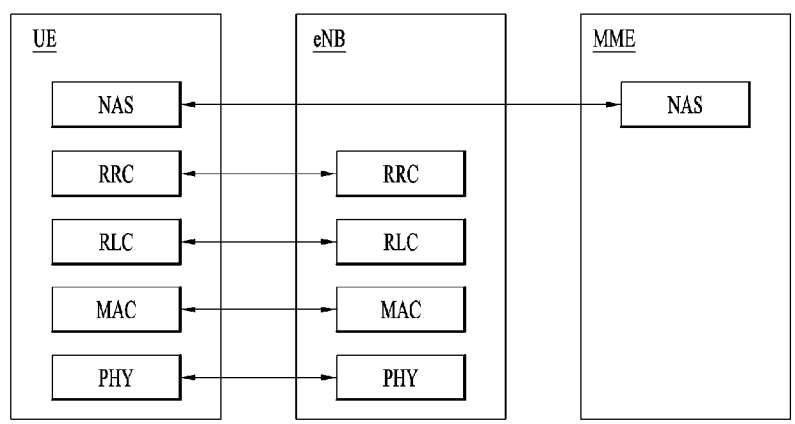
FIG. 3 is a diagram illustrating the structure of a radio interface protocol in a control plane.
Figure 4:
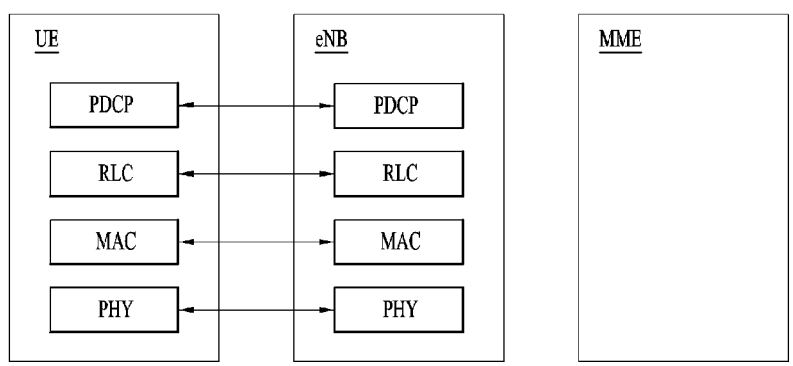
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
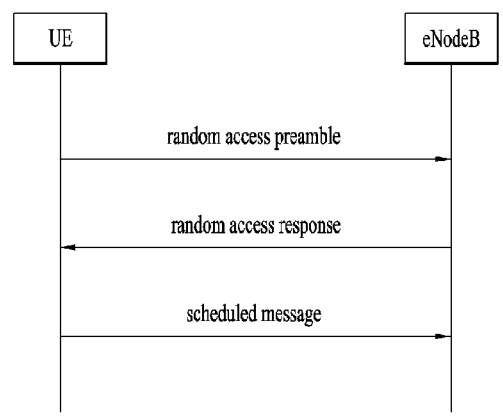
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB transmits a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
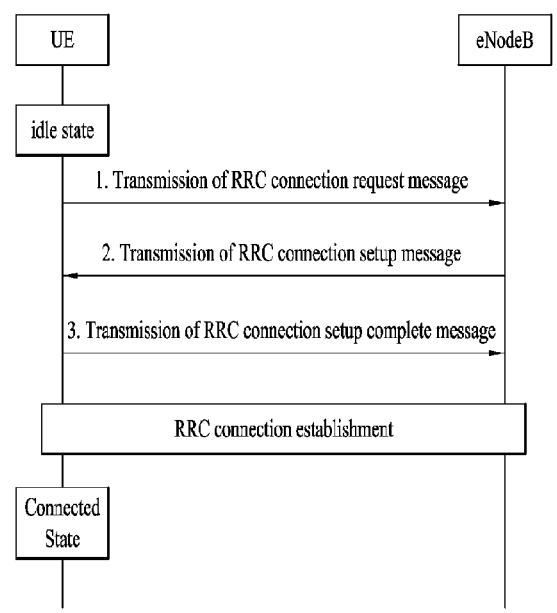
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
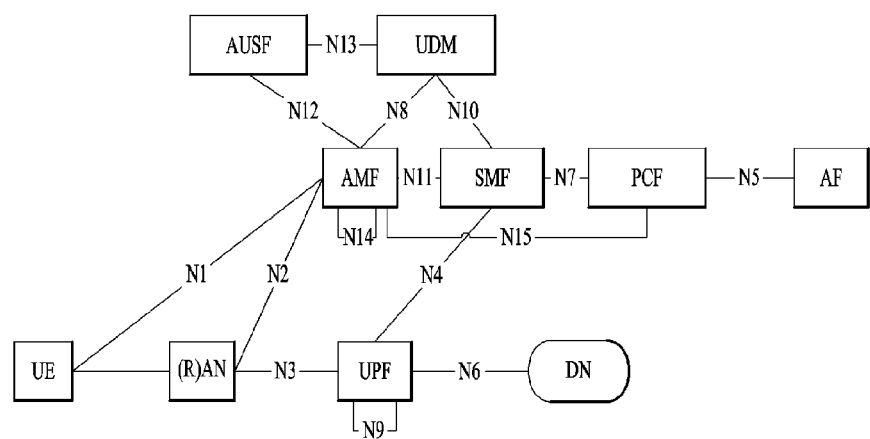
FIG. 7 is a diagram illustrating a 5th generation (5G) system.

In a next generation system (i.e., 5G core network (CN)), the functionality of an MME in the legacy EPC may be divided into a Core Access and Mobility Management Function (AMF) and a Session Management Function (SMF). The AMF is in charge of NAS interaction with the UE and mobility management (MM), and the SMF is in charge of session management (SM). In addition, the SMF manages a user plane function (UPF), which corresponds to a gateway for routing user traffic, i.e., managing a user plane. This may be interpreted to mean that the SMF manages the control plane of an S-GW and a P-GW in the legacy EPC and the UPF manages the user plane thereof. For user traffic routing, at least one UPF may exist between a RAN and a data network (DN). In other words, the legacy EPC may be implemented in the 5GS as illustrated in FIG. 7. The 5GS defines a protocol data unit (PDU) session as a concept related to a PDN connection in the legacy EPS. The PDU session refers to association between the UE and the DN that provides PDU connectivity services and may be divided into a PDU session of IP type, a PDU session of Ethernet type, and a PDU session of unstructured type. Unified data management (UDM) serves as an HSS of the EPC, and a policy control function (PCF) serves as a PCRF of the EPC. To satisfy the requirements of the 5GS, these functions may be extended and provided. The details of the 5GS architecture, individual functions, and individual interfaces may be found in TS 23.501.

The details of the 5GS are specified in TS 23.501, TS 23.502, and TS 23.503. Thus, the present disclosure assumes that relevant standards are applied to the 5GS. In addition, the architecture of a next generation radio access network (NG-RAN) and the details thereof are specified in TS 38.300. The 5GS supports non-3GPP access. The details of architectures, network elements, etc. for supporting the non-3GPP access are specified in clause 4.2.8 of TS 23.501, and the details of procedures for supporting the non-3GPP access are specified in clause 4.12 of TS 23.502. A wireless local area network (WLAN) access may be considered as a representative example of the non-3GPP access, and the WLAN access may include both a trusted WLAN access and an untrusted WLAN access. In the 5GS, an access and mobility management function (AMF) may perform registration management (RM) and connection management (CM) for non-3GPP access as well as 3GPP access.

A procedure in which the UE establishes a PDU session over the 3GPP access and a procedure in which the UE establishes a PDU session over the non-3GPP access are specified in TS 23.502 v1.2.0. As the prior art related to the present disclosure, these procedures are included in the present disclosure.

The 5GS needs to support interworking with the legacy system, EPS. The details of the interworking between the 5GS and EPS are specified in clause 4.3 (Interworking with E-UTRAN connected to EPC) and clause 5.17.2 (Interworking with EPC) of TS 23.501 and clause 4.11 (System interworking procedures with EPS) of TS 23.502.

When a UE is handed over from the 5GS to the EPS, the UE may have not only a PDU session associated with the 3GPP access but also a PDU session associated with the non-3GPP access. In the current 5GS, the (handover) procedure is defined without consideration of when the UE has both the PDU session associated with the 3GPP access and the PDU session associated with the non-3GPP access (see the procedure "5GS to EPS handover using N26 interface" in clause 4.11.2.1 of TS 23.502 v1.2.0). As a result, in the current 5GS, when the UE has both the PDU session associated with the 3GPP access and the PDU session associated with the non-3GPP access, the UE moves the PDU sessions to the 3GPP access. This may cause a problem that the PDU sessions are moved from the non-3GPP access to the 3GPP access, which is against traffic steering policies/rules, service provider policies, and/or user preferences. For example, when the traffic steering policies/rules indicate that the non-3GPP access (e.g., WLAN) is more suitable than the 3GPP access in playing video in a specific application, if a PDU session for this application moves to the EPS, i.e., E-UTRAN together with another PDU session for the 3GPP access even though the PDU session for the application is capable of being provided over the non-3GPP access, it may be against the traffic steering policies/rules.

Accordingly, a description will be given of a method of handing over only the PDU session associated with the 3GPP access to the EPS when the UE is served by the same PLMN for both the 3GPP access and non-3GPP access in the 5GS.

Herein, the PDU session associated with the 3GPP access may refer to a case in which the last or most recent traffic is routed over the 3GPP access, and the PDU session associated with the non-3GPP access may refer to a case in which the last or most recent traffic is routed over the non-3GPP access. If no traffic is routed after the PDU session is established, the established access may be recognized as the access associated with the corresponding PDU session. If no traffic is routed after the access associated with the PDU session is moved, the moved access may be recognized as the access associated with the corresponding PDU session. The PDU session associated with the 3GPP access may be referred to as a 3GPP access PDU session or a 3GPP PDU session, and the PDU session associated with the non-3GPP access may be referred to as a non-3GPP access PDU session or a non-3GPP PDU session.

Embodiment 1

Figure 8:
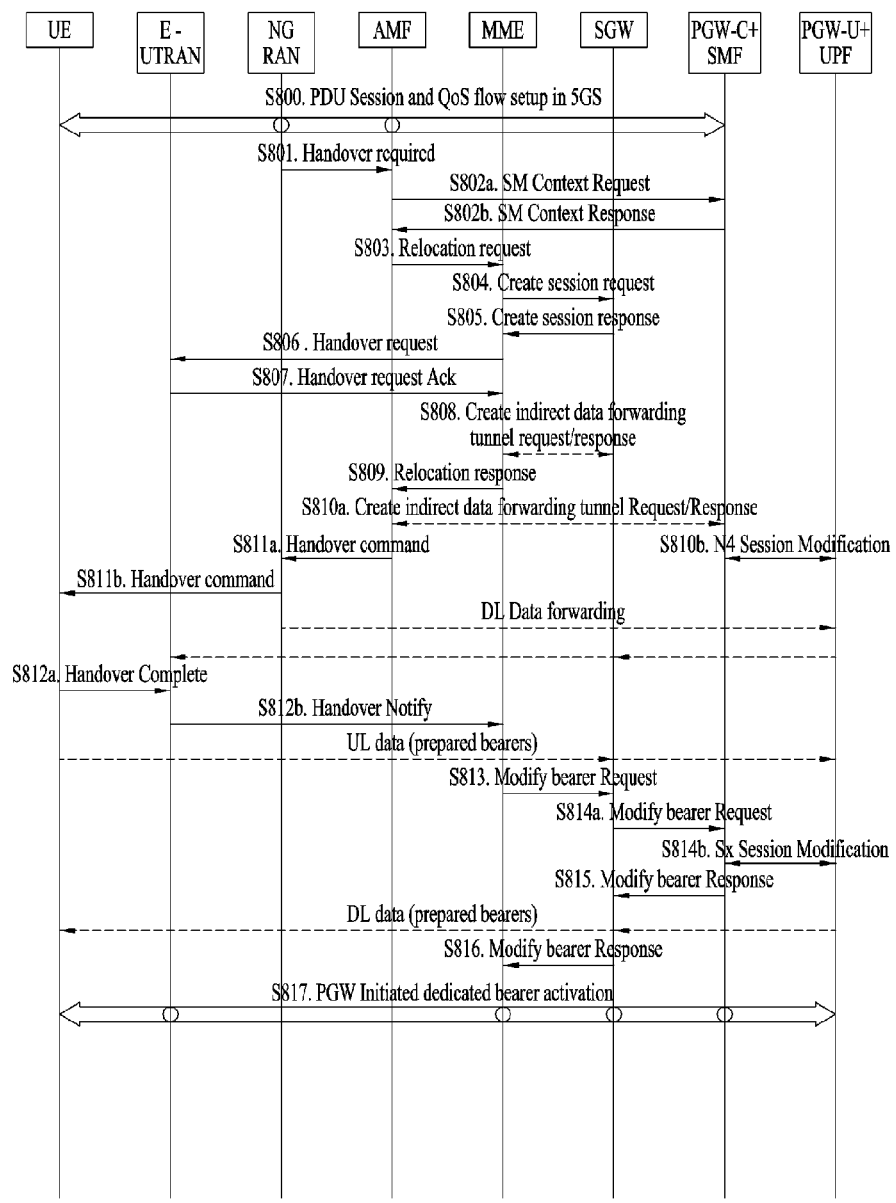
FIGS. 8 to 10 are diagrams for explaining handover procedures according to embodiments of the present disclosure.

FIG. 8 illustrates a method of transmitting and receiving a signal related to handover from the 5GS to the EPS according to an embodiment of the present disclosure. Referring to FIG. 8, an NG-RAN determines that a UE needs to be handed over to an E-UTRAN. The NG-RAN transmits a Handover Required message (Target eNB ID, Source to Target Transparent Container, etc.) to an AMF. That is, the AMF receives the Handover Required message from the NG-RAN.

The AMF determines, from a Target eNB Identifier information element (IE), that the type of handover is Handover to E-UTRAN. The AMF requests an SM context to a packet data network gateway+session management function (PGW+SMF) (802*a*) (the PGW+SMF may be referred to as a PGW-C+SMF, an SMF, or a PGW). Such a request may include a mapped EPS bearer context. This step is performed with all PGW+SMFs allocated to the UE.

In this case, the SM Context Request may be for a PDU session associated with the 3GPP access among multiple PDU sessions. The multiple PDU sessions may include one or more PDU sessions associated with 3GPP access and zero or more PDU sessions associated with non-3GPP access. For example, the AMF requests the SM context to the SMF for the handover, and the SMF is an SMF for the 3GPP access PDU session. If the UE, which is to be handed over by the AMF, has the non-3GPP access PDU session, the AMF may not transmit an SM Context Request message, which is used to request the SM context to the SMF, for this PDU session. Instead, the AMF transmits the SM Context Request message to SMFs for all 3GPP access PDU sessions. In this case, a single SMF may control not only 3GPP access PDU sessions but also non-3GPP access PDU sessions. If so, when requesting the SM context to the SMF, the AMF may set the type of an access to the 3GPP access.

Alternatively, when requesting the SM context to the SMF, the AMF may include a PDU session ID. Thus, the SMF may recognize that the SM Context Request is for the 3GPP access PDU session. The SM Context Request may include the PDU session ID(s) for the 3GPP access PDU session(s). The PDU session ID may be interpreted to as information for indicating, recognizing, or identifying the PDU session. Specifically, the PDU session ID may mean reference information assigned by the SMF to identify the PDU session when the PDU session is established, and more particularly, when the SM context for the PDU session is created. The reference information may be used to indicate the PDU session during PDU session related operations between the AMF and SMF, for example, PDU Session Update, PDU Session Release, SM Context Request for PDU Session, etc. after establishment of the PDU session. When the AMF transmits the SM Context Request message to request the SM context from the SMF, if the AMF includes reference information about the SM context, the SMF may identify, based on the reference information, the PDU session of which the SM context the AMF desires to receive. This may be applied throughout the present disclosure.

The AMF may store access information for each PDU session. That is, it is assumed that the AMF has information about an access associated with the PDU session of the UE (i.e., information about whether the access associated with the UE's PDU session is the 3GPP access or non-3GPP access). It is also assumed that the AMF has information on the type of an access associated with the PDU session ID.

In step S802*b*, the AMF receives the SM context from the PGW+SMF. The received SM context may be the SM context for the PDU session corresponding to the PDU session ID. When the AMF transmits the request together with the PDU session ID, the SMF transmits only the SM context for the corresponding PDU session. When the AMF transmits the request together with the access type, the SMF transmits only the SM context for the PDU session corresponding to the access type included in the request. When the 3GPP access type is configured, the AMF may obtain information about the SM context for the 3GPP access PDU session from the SMF.

Thereafter, the 3GPP PDU session is moved to the 3GPP access through individual steps, which will be described later. Thus, only the 3GPP access PDU session is handed over to the EPS. In this case, the traffic steering policies/rules, service provider policies, and/or user preferences may be reflected better than when both the 3GPP access PDU session and non-3GPP access PDU session are handed over to the 3GPP. In addition, compared to the prior art where the non-3GPP access PDU session is moved to the 3GPP, the ineffectiveness of establishing a PDN connection over the 3GPP access may be reduced.

When the AMF transmits a Relocation Request message to an MME in step S803, the AMF includes only information on the SM context for the 3GPP access PDU session without information on the SM context for the non-3GPP access PDU session. The SGW address and TEID for both a control-plane and an EPS bearer in the message is to assist a target MME in selecting a new SGW.

After selecting the SGW, the MME transmits a Create Session Request message for at least one PDN connection to the SGW (S804). The SGW allocates its local resources and then returns the allocated local resources to the MME in a Create Session Response message (S805).

In step S806, the MME requests a target eNB to establish bearer(s) by transmitting a Handover Request message. This message contains a list of EPS bearer IDs that need to be set up. The target eNB allocates requested resources and returns applicable parameters to the target MME in a Handover Request Acknowledge message (Target to Source Transparent Container, EPS Bearers setup list, EPS Bearers failed to setup list, etc.) (S807).

If the MME determines that indirect forwarding is applied, the MME transmits an Indirect Data Forwarding Tunnel Request message (Target eNB Address, TEID(s) for DL data forwarding, etc.) to the SGW in step S808. The SGW returns a Create Indirect Data Forwarding Tunnel Response message (Cause, SGW Address(es) and SGW DL TEID(s) for data forwarding, etc.) to the target MME.

In step S809, the MME transmits a Relocation Response message (Cause, List of Set Up RABs, EPS Bearers setup list, MME Tunnel Endpoint Identifier for Control Plane, RAN Cause, MME Address for Control Plane, Target to Source Transparent Container, Address(es) and TEID(s) for Data Forwarding, etc.) to the AMF.

If the indirect forwarding is applied, the AMF forwards information related to data transfer to the SGW to the PGW+SMF in step S810*a*. The PGW+SMF returns a Create Indirect Data Forwarding Tunnel Response.

In step S811*a*, the AMF transmits a Handover Command to a source NG-RAN. The source NG-RAN instructs the UE to perform handover to a target access network by transmitting the Handover Command. This message includes a transparent container including radio aspect parameters that the target eNB sets up in the preparation phase. The UE correlates the ongoing QoS flow with an indicated EPS bearer ID set up by the Handover Command. The UE locally deletes QoS flows with no assigned EPS bearer IDs.

In steps S812a and b, if the UE successfully accesses the target eNB, the target eNB informs the target MME of the successful access by transmitting a Handover Notify message.

In step S813, the target MME informs the SGW that the MME is responsible for all the bearers established by the UE by transmitting a Modify Bearer Request message for each PDN connection. The target MME releases a non-accepted EPS bearer context by triggering a bearer context deactivation procedure. If the SGW receives a DL packet for a non-accepted bearer, the SGW drops the DL packet and does not transmit a Downlink Data Notification to an SGSN.

In step S814, the SGW informs the PGW+SMF of relocation by transmitting the Modify Bearer Request message for each PDN connection. The PGW locally deletes the QoS flows with no assigned EPS bearer IDs. Due to the "match all" filter in the default QoS flow, the PGW maps the IP flows of the deleted QoS flows to the default QoS flow.

In step S815, the PGW+SMF confirms the Modify Bearer Request. In this step, a user plane path is established for the default bearer and the dedicated GBR bearers between the UE, target eNB, SGW, and PGW+SMF.

In step S816, the SGW confirms that a user plane switches to the MME from a Modify Bearer Response message.

In step S817, the PGW+SMF initiates a dedicated bearer activation procedure for non-GBR QoS flows by mapping the parameters of non-GBR flows to EPC QoS parameters. This configuration may be triggered by a PCRF+PCF. If a PCF is deployed, the mapped QoS parameters may also be provided. This procedure is specified in clause 5.4.1 of TS 23.401.

According to a second method, which is different from the above-described method, the following operations may be performed in steps S802 to S803. In step S802a, the AMF requests the SM contexts to SMF for all PDU sessions of the UE, regardless of accesses associated with the PDU sessions of the UE. In other words, it is assumed that the AMF does not have information about the accesses associated with the PDU sessions of the UE (i.e., information about whether the access associated with each PDU session of the UE is the 3GPP access or non-3GPP access). When transmitting the SM Context Request message for the request, the AMF may include information indicating that the UE is handed over to the EPS, information indicating that the UE is handed over to the E-UTRAN, or information indicating that the UE performs inter-system handover. However, since the message represents that the handover is required, the SMF may recognize the details of the handover implicitly.

In step S802b, if the access associated with the UE's PDU session is the 3GPP access, the SMF transmits a response to the AMF by including the SM context thereof. On the contrary, if the access associated with the UE's PDU session is the non-3GPP access, the SMF provides no SM context information to the AMF. In addition, the SMF may explicitly or implicitly include information indicating that the corresponding PDU session is the non-3GPP access PDU session or information indicating that the PDU session does not need to be handed over in the response. The SMF may explicitly know whether the type of an access associated with a PDU session is the 3GPP access or non-3GPP access when the PDU session is established or when the access is changed. In addition, the SMF may recognize the access type by obtaining user location information at that time (for example, the SMF may recognize the 3GPP access in the case of a cell-ID, the non-3GPP access in the case of WLAN-related information (i.e., SSID), and the non-3GPP access in the case of a UE local IP address (used to reach the N3IWF) and optionally, a UDP or TCP source port number).

In step S803, the AMF determines to hand over to the EPS only the PDU session of which the SM context is received. In other words, the AMF determines to hand over only the 3GPP access PDU session to the EPS. That is, the non-3GPP access PDU session is not handed over to the EPS. Accordingly, when transmitting the Relocation Request message to the MME, the AMF includes only information on the SM context for the 3GPP access PDU session without information on the SM context for the non-3GPP access PDU session.

According to a third method, the following operations may be performed in steps S802 to S803. In step S802a, the AMF requests the SM contexts to SMF for all PDU sessions of the UE, regardless of accesses associated with the PDU sessions of the UE. In other words, it is assumed that the AMF does not have information about the accesses associated with the PDU sessions of the UE (i.e., information about whether the access associated with each PDU session of the UE is the 3GPP access or non-3GPP access). When transmitting the SM Context Request message for the request, the AMF may include information indicating that the UE is handed over to the EPS, information indicating that the UE is handed over to the E-UTRAN, or information indicating that the UE performs inter-system handover. However, since the message represents that the handover is required, the SMF may recognize the details of the handover implicitly.

In step S802b, the SMF transmits a response to the AMF by including information on the SM contexts for the PDU sessions of the UE. In this case, the SMF includes information on the type of the access associated with the PDU session. The SMF may always include the information on the type of the access associated with the PDU session. Alternatively, the SMF may include the information only when the SMF recognizes that the request from the AMF is related to handover of the UE to the EPS as described in step S802a. The SMF may recognize whether the type of the access associated with the PDU session is the 3GPP access or non-3GPP access in the same way as descried in step S802b of the second method.

In step S803, the AMF may know based on the response from the SMF that the type of the access associated with the PDU session is the 3GPP access. Thus, the AMF may determine to hand over only the 3GPP access PDU session to the EPS. That is, the non-3GPP access PDU session is not handed over to the EPS. Accordingly, when transmitting the Relocation Request message to the MME, the AMF includes only information on the SM context for the 3GPP access PDU session without information on the SM context for the non-3GPP access PDU session.

In all of the above-described methods, when the UE has the non-3GPP access PDU session, the AMF keeps the RM context, CM context, and SM context for the non-3GPP access. That is, the AMF continues serving the UE over the non-3GPP access.

The above methods are described under the assumption that the 3GPP access PDU session for the UE is handed over to the EPS. However, the non-3GPP access PDU session as well as the 3GPP access PDU session may be handed over to the EPS, or only the non-3GPP access PDU session may be handed over to the EPS. Which PDU session is to be handed over (i.e., i.e., whether either or both of the 3GPP access and non-3GPP access is handed over) may be determined based on one of the following information.

Configuration information and service provider policies of the network function

Subscriber information on the UE

Policy information on the data network name (DNN) of the PDU session

Information on whether the UE is roaming

Information on the home public land mobile network (HPLMN) of the UE

Information on roaming agreements with the HPLMN when the UE is roaming

In the first and third methods among the above methods, the AMF may determine which PDU session is handed over to the EPS based on the access associated therewith, and the details thereof may be properly applied. In the second method, the SMF may determine which PDU session is handed over to the EPS based on the access associated therewith, and the details thereof may be properly applied.

According to the above methods, when the UE recognizes that the non-3GPP access PDU session is moved to the EPS, the UE transmits relevant traffic/flow to the EPC over the 3GPP access. Additionally, the UE or network (AMF/SMF) may disconnect/release the connection with the 5GC over the non-3GPP access. For example, Internet protocol security (IPSec) with a non-3GPP interworking function (N3IWF) may be terminated. Alternatively, the session context for a UPF may be removed. Upon receiving the Handover Command in step S811b of FIG. 8, the UE may recognize that the non-3GPP access PDU session is moved to the EPS. This may be inferred implicitly from DRB configuration information on an EPS bearer for the non-3GPP access PDU session in RRCConnectionReconfiguration included in the Handover Command or explicitly from information indicating that the non-3GPP access PDU session is handed over, which is included in the Handover Command. In the latter case, the AMF may transmit the corresponding information to the NG-RAN in step S811a, and the NG-RAN may forward the information in step S811b. Alternatively, the AMF may include the information in a NAS message and then transmit the NAS message to the UE in step S811a, and the UE may obtain the information from the NAS message in step S811b.

Embodiment 2

According to the procedure "5GS to EPS handover using N26 interface" in clause 4.11.2.1 of TS 23.502, when a UE is served by different PLMNs for the 3GPP access and non-3GPP access in the 5GS, an AMF that serves the 3GPP access hands over only the PDU session associated with the 3GPP access to the EPS. In this case, if the PDU session associated with the non-3GPP access also needs to be handed over to the EPS, a method of moving the PDU session associated with the non-3GPP access, which is served by one of the different PLMNs, may be required. In the following, the method will be described. It may be understood that in referring to FIG. 8, the details of Embodiment 1 or the features specified in TS 23.502 v1.2.0 are applicable.

Embodiment 2-1 (UE Based Solution)

After step S811b of FIG. 8, and more particularly, at or after step S812a of FIG. 8, the UE hands over the non-3GPP access PDU session to the EPS. The handover is performed since the UE uses the 3GPP access and non-3GPP access in the different PLMNs and determines that the non-3GPP access PDU session also needs to be handed over to the EPS. The determination may be made by default or based on at least one of the following various information.

i) Information configured in the UE: For example, it may be configured that when the 3GPP access PDU session is handed over to the EPS, the non-3GPP access PDU session is also handed over to the EPS.

ii) Traffic steering/routing policies related to the system or CN: For example, the 5GS (or 5GC) may have a higher priority than the EPS (or EPC). Alternatively, traffic steering may be allowed only by one CN.

iii) Traffic steering/routing policies related to the access type: Among the 3GPP access and non-3GPP access, a preferred access type may be determined for each application/flow.

iv) The signal strength, quality, etc. of the non-3GPP access network (e.g., WLAN): For example, it may be regulated that when the strength of a WLAN signal is less than or equal to a predetermined threshold, traffic is routed over the 3GPP access.

v) Whether the UE operates in single-registration mode or dual-registration mode: For example, when the UE operates in the single-registration mode, the handover of the non-3GPP access PDU session to the EPS may be determined.

To hand over the non-3GPP access PDU session to the EPS, the UE may operate as follows. This may be interpreted to mean that traffic/flow that has been routed via the non-3GPP access and 5GC starts to be routed via the EPC.

1)

1-1) When the UE determines to hand over a PDU session to the EPC via the 3GPP access (i.e., E-UTRAN) based on the above information, the UE transmit a PDN connection establishment request to an MME. The PDN connection establishment request may include the type of the handover or information indicating that the handover is from the 5GC. Upon receipt of the request, the MME starts to establish a PDN connection. The details thereof are specified in TS 23.401. When the UE includes information on the handover in the PDN connection establishment request as described above, the MME searches for an SMF that has served the PDN connection (i.e., PDU session) and establishes the PDN connection with the SMF to establish the PDN connection in the EPC. However, if impossible (for example, when the corresponding SMF is not present in the HPLMN of the UE or in the same PLMN as the MME), the MME may inform the UE that the PDN connection request for the handover is rejected. Upon receiving the rejection, the UE may transmit the PDN connection establish request again without the handover-related information.

1-2) When the UE determines to hand over a PDU session to the EPC via the non-3GPP access (i.e., WLAN) based on the above information, the UE may perform an Attach procedure to the EPC via an ePDG and then establish a PDN connection. Alternatively, the UE may perform the Attach procedure to the EPC via a trusted WLAN (TWAN) and then establish the PDN connection. The details thereof are specified in TS 23.402. The UE may provide the network the type of the handover or information indicating that the handover is from the 5GC. When the UE provides information on the handover as described above, the network (ePDG or TWAN) searches for an SMF that has served the PDN connection (i.e., PDU session) and establishes the PDN connection with the SMF to establish the PDN connection in the EPC. However, if impossible (for example, when the corresponding SMF is not present in the HPLMN of the UE or in the same PLMN as the ePDG/TWAN), the network may inform the UE that the Attach procedure or PDN connection request for the handover is rejected. Upon receiving the rejection, the UE may perform the Attach procedure again via the ePDG or TWAN without the handover-related information.

2) After moving the non-3GPP access PDU session to the EPS, the UE performs deregistration with the non-3GPP access (see clause 4.2.2.3.2 (UE-initiated Deregistration) and clause 4.12.3 (Deregistration procedure for untrusted non-3gpp access) of TS 23.502).

The above-described method may be used for other problems as well as the problem of Embodiment 2. The method may be used for both cases where the UE is served by the same PLMN or different PLMNs for the 3GPP access and non-3GPP access. That is, the method may be applied such that the network hands over the 3GPP access PDU session to the EPS and the UE hands over the non-3GPP access PDU session to the EPS. The UE may autonomously determine that the non-3GPP access PDU session needs to be handed over to the EPS (for example, according to a configuration). Alternatively, the network may instruct the UE to perform the handover. In the latter case, the network may provide the instruction to the UE according to at least one of the following methods.

a) The instruction information may be included in the Handover Command in step S811*b* of FIG. 8. The NG-RAN may provide the instruction information. Alternatively, the AMF may transmit the corresponding information to the NG-RAN in step S811*a*, and the NG-RAN may forward the information in step S811*b*. Further, the AMF may include the information in a NAS message and then transmit the NAS message to the UE in step S811*a*, and the UE may obtain the information from the NAS message in step S811*b*.

b) The network may separately transmit the instruction information to the UE in a message before step S811*b* of FIG. 8. In this case, upon receipt of the information, the UE may hand over the non-3GPP access PDU session to the EPS. The message may be transmitted from the NG-RAN to the UE at or after step S801. Alternatively, after preforming reception in step S801, the AMF may transmit the message to the UE.

Embodiment 2-2 (Network Based Solution)

After step S801, and more particularly, before step S802*a* or step S803, the AMF receives information on PDU sessions established by the UE from UDM. The UDM may store session contexts (i.e., PDU session IDs, IDs/addresses of SMFs managing the PDU sessions, DNN information, and/or roaming mode (i.e., Home Routed, Local Breakout, Non-roaming, etc.)). If there is a PDU session ID that the AMF does not know, the AMF may recognize based on the received information that the UE is simultaneously served by another AMF in a different PLMN over the non-3GPP access. The AMF may determine which PDU sessions are capable of being handed over based on the session contexts from the UDM. For example, if a PDU session over the non-3GPP access is established based on Local Breakout, the AMF is incapable of handing over the PDU session. Thus, the AMF may determine handover of PDU sessions established based on Home Routed or Non-roaming. If the roaming mode is not saved, the AMF may know the PLMN of the SMF based on the SMF ID/address and then determine whether the roaming mode is Local Breakout or Home Routed. If the SMF and AMF have the same PLMN, the AMF may determine that the roaming mode is Local Breakout. If the PLMN of the SMF is different from that of the AMF but equal to the HPLMN of the UE, the AMF may determine the roaming mode is Home Routed.

After determining the handover of the PDU sessions as described above, the AMF may hand over the PDU sessions according to the methods of Embodiment 1. In this case, SMFs may separately determine whether to move non-3GPP access PDU sessions. In other words, when the current PDU sessions should not be moved to the 3GPP based on the policies and configurations of the network, the SMFs may not provide contexts for the corresponding PDU sessions to the AMF. Alternatively, when the SMFs provide the contexts, the SMFs may explicitly inform the AMF that the PDU sessions should not be handed over. Thus, upon receiving the session contexts from the SMFs, the AMF may determine which PDU sessions are moved and then perform the handover thereof.

For PDU sessions that are not handed over by the network, the UE accepts that the handover thereof is disabled. If necessary, the UE may establish a new PDN connection to the EPC.

Embodiment 2-3 (Network Based Solution)

After step S801 or before step S803, if the UE to be handed over to the EPS has the non-3GPP access PDU session in another PLMN, the AMF may transmit a message for requesting the SM context for the non-3GPP access PDU session to UDM. The AMF may transmit such a request if the AMF serves the UE over the 3GPP access. Additionally, the AMF may transmit the request if the AMF recognizes that the UE has been connected to the 5GC over the non-3GPP access in the other PLMN. The AMF may obtain such information from the UE or other network functions including the UDM.

When requesting the SM context for the non-3GPP access PDU session to the UDM, the AMF may include information indicating that the UE is handed over to the EPS, information indicating that the UE is handed over to the E-UTRAN, or information indicating that the UE performs inter-system handover. However, since the request message represents that the handover is required, the UDM may recognize the details of the handover implicitly.

After receiving the request, the UDM checks whether there is another AMF serving the UE over the non-3GPP access. When there is another AMF serving the UE over the non-3GPP access, the UDM requests the AMF related to the non-3GPP access to transmit the SM context for the non-3GPP access PDU session. When transmitting the request, the UDM may include the information indicating that the UE is handed over to the EPS, the information indicating that the UE is handed over to the E-UTRAN, or the information indicating that the UE performs inter-system handover. However, since the request message represents that the handover is required, the AMF related to the non-3GPP access may recognize the details of the handover implicitly.

Upon receiving the request, the AMF requests the SM context to the SMF as in steps 802*a* and 802*b* of FIG. 8. Specifically, the AMF requests the SM contexts for all PDU sessions of the UE. In this case, the AMF may transmit a message identical to or different from that in steps 802*a* and 802*b* of FIG. 8. When transmitting the message, the AMF may include the information indicating that the UE is handed over to the EPS, the information indicating that the UE is handed over to the E-UTRAN, or the information indicating that the UE performs inter-system handover. However, since the request message represents that the handover is required, the AMF related to the non-3GPP access may recognize the details of the handover implicitly. In addition, it may be implicitly or explicitly indicated that the handover is performed in the other PLMN.

When the SMF receives the request from the AMF, the SMF may provide the SM contexts for PDU sessions managed by the SMF for the handover. Alternatively, for the handover, the SMF may provide the SM contexts for PDU sessions established based on Home Routed. In the former case, when providing the SM contexts to the AMF, the SMF may inform that each PDU session is established based on either Home Routed or Local Breakout. In the latter case, if a PDU session is established based on Local Breakout, the SMF may inform the AMF of a reason why no SM context is provided. For example, the SMF may inform that the PDU session is established based on Local Breakout.

After receiving such a response from the SMF, the AMF forwards the response to the UDM. If there is a PDU session established based on Local Breakout, the AMF operates as follows.

If the AMF receives the SM context thereof,
The AMF forwards the SM context to the UDM and informs that PDU session is established based on Local Breakout, or
The AMF does not forward the SM context to the UDM but provides information on the PDU session established based on Local Breakout (PDU session ID, DNN, EPS bearer ID, etc.).
If the AMF does not receive the SM context,
The AMF may provide the information on the PDU session established based on Local Breakout (PDU session ID, DNN, EPS bearer ID, etc.).

Upon receipt of such a response from the AMF related to the non-3GPP access, the UDM may forward the response to the AMF related to the 3GPP access.

After receiving the response from the UDM, the AMF related to the 3GPP access may transmit a Relocation Request message to an MME in step S803 by including not only the PDU session maintained by the corresponding AMF but also the non-3GPP access PDU session which is maintained in the other PLMN.

For PDU sessions that are not handed over by the network, the UE accepts that the handover thereof is disabled. If necessary, the UE may establish a new PDN connection to the EPC.

In Embodiments 2-2 and 2-3, the handover of the non-3GPP access PDU session in the other PLMN has been described. However, the AMF, i.e., the AMF related to the 3GPP access may determine to hand over only the 3GPP access PDU session to the EPS. Alternatively, the UDM may determine the handover. For example, when the AMF requests the UDM to transmit the SM context for the non-3GPP access PDU session, the UDM may inform that the handover of the non-3GPP access PDU session to the EPS is not required. Further, the AMF related to the non-3GPP access may determine the handover, or the SMF serving the 3GPP access PDU session may determine the handover. When it is determined that the handover of the non-3GPP access PDU session to the ESP is not required, the result is sent to a network function that requests the determination. Eventually, the result is delivered to the AMF related to the 3GPP access.

Embodiment 3

When a UE is handed over from the 5GS to the EPS, the UE may have not only PDU sessions having EPS bearer IDs (EBIs) assigned (or allocated) but also PDU sessions having no EBIs assigned. For a PDU session movable from the 5GS to the EPS, the 5GS needs to assign an EBI thereto during PDU session establishment or PDU session modification. For example, when a PGW-C+SMF (or an H-SMF in a Home Routed case) (hereinafter, the H-SMF is referred to as the SMF) requests to an AMF to assign EBI(s), the AMF assigns the EBI(s) and provides the EBI(s) to the SMF. In addition, the AMF stores a pair of the assigned EBI(s) and allocation and retention priority (ARP) together with a PDU session ID. However, the EBI(s) may not be assigned to all PDU sessions. If the SMF serves the UE multiple PDU sessions having the same DNN but different single network slice selection assistance information (S-NSSAI), the SMF requests to assign the EBI(s) only to PDU sessions served by a common UPF (or PDU session anchor (PSA)) based on service provider policies. In addition, although the SMF requests the AMF to assign the EBI(s), the AMF may reject the request. For example, when the AMF assigns the EBI(s) to a PDU session with a specific DNN, if an SMF that does not serve the PDU session requests the AMF to assign the EBI(s) to a PDU session with the same DNN, the AMF may reject the request based on the service provider policies. Alternatively, the AMF may revoke the assigned EBI(s) and then assign new EBI(s) as requested.

The details of EBI assignment may be found in clause 4.11.1 (N26 based Interworking Procedures) of TS 23.502 v15.2.0, and more specifically, in clause 4.11.1.1 (General), clause 4.11.1.4 (Procedures for EPS bearer ID allocation), and clause 5.2.2.2.13 (Namf_Communication_EBIAssignment service operation) thereof.

Therefore, the PDU session having no EBI assigned may not need to be moved to the EPS. However, according to the procedure "5GS to EPS handover using N26 interface" in clause 4.11.2.1 of TS 23.502, the AMF may hand over all PDU sessions to the EPS without consideration of the EBI assignment. Accordingly, the present disclosure proposes a method of moving only a PDU session movable to the EPS, i.e., a PDU session with the EBI to the EPS. The above problem is independent of whether the 3GPP access and non-3GPP access of the UE are served by the same PLMN or different PLMNs. Thus, the following embodiment is applicable to all cases.

Hereinafter, the steps of the present disclosure (illustrated in FIG. 8) will be described with reference to clause 4.11.2.1 of TS 23.502. The EBI-related problem is independent of whether the 3GPP access and non-3GPP access of the UE are served by the same PLMN or different PLMNs. Thus, the following embodiment is applicable to all cases.

In step S802a, the AMF requests an SM context to the SMF (P-GW+SMF) for handover. In this case, the SMF may be an SMF serving a PDU session having EBI(s) assigned. That is, only when the AMF stores the PDU session with the assigned EBI(s), and more particularly, only when the AMF stores a pair of the EBI(s) and ARP or only when the AMF has the assigned EBI(s), the AMF requests the SMF that serves the corresponding PDU session to transmit the CM context therefor. For a PDU session having no EBI assigned, the AMF may not request the SM context therefor from an SMF serving the corresponding PDU session. In this case, since both the PDU session with the assigned EBI and the PDU session with no assigned EBI may be managed by the same SMF, the AMF may include a PDU session ID when requesting the SM context to the SMF, and the SMF may recognize that the SMF needs to provide the SM context for the corresponding PDU session.

In step S802b, The SMF transmits only the SM context for the corresponding PDU session to the AMF since the AMF provides the PDU session ID when requesting the SM context.

In step S803, only the PDU session movable to the EPS is handed over to the EPS. That is, when transmitting a Relocation Request message to an MME, the AMF includes information on the SM context for the PDU session with the assigned EBI without information on the SM context for the PDU session with no assigned EBI.

The method of Embodiment 3 may be combined with one of the methods described in Embodiment 1. For example, the first method of Embodiment 1 may be combined with the method of Embodiment 3. In this case, the AMF requests the SM context to the SMF for a PDU session in step S802b, and the PDU session may be associated with the 3GPP access and have EBI(s) assigned. This may be interpreted to mean that the AMF requests the SMF serving the PDU session satisfying the above condition to transmit the SM context. Whether the condition is satisfied may be determined based on information on the PDU session stored in the AMF, i.e., access type information (either the 3GPP access or non-3GPP access) and information on a pair of the assigned EBI and ARP. When the AMF requests the SM context for the PDU session satisfying the condition to the SMF, the AMF may also transmit the PDU session ID. The PDU session ID may be stored in the AMF as information on the PDU session, and information on the SMF serving the PDU session may also be stored in the AMF.

In step S802b, the SMF transmits the SM context for the corresponding PDU session to the AMF based on the PDU session ID provided from the AMF.

Although the present disclosure is described based on handover from the 5GS to the EPS, the present disclosure is applicable to idle-mode mobility from the 5GS to the EPS.

Figure 9:
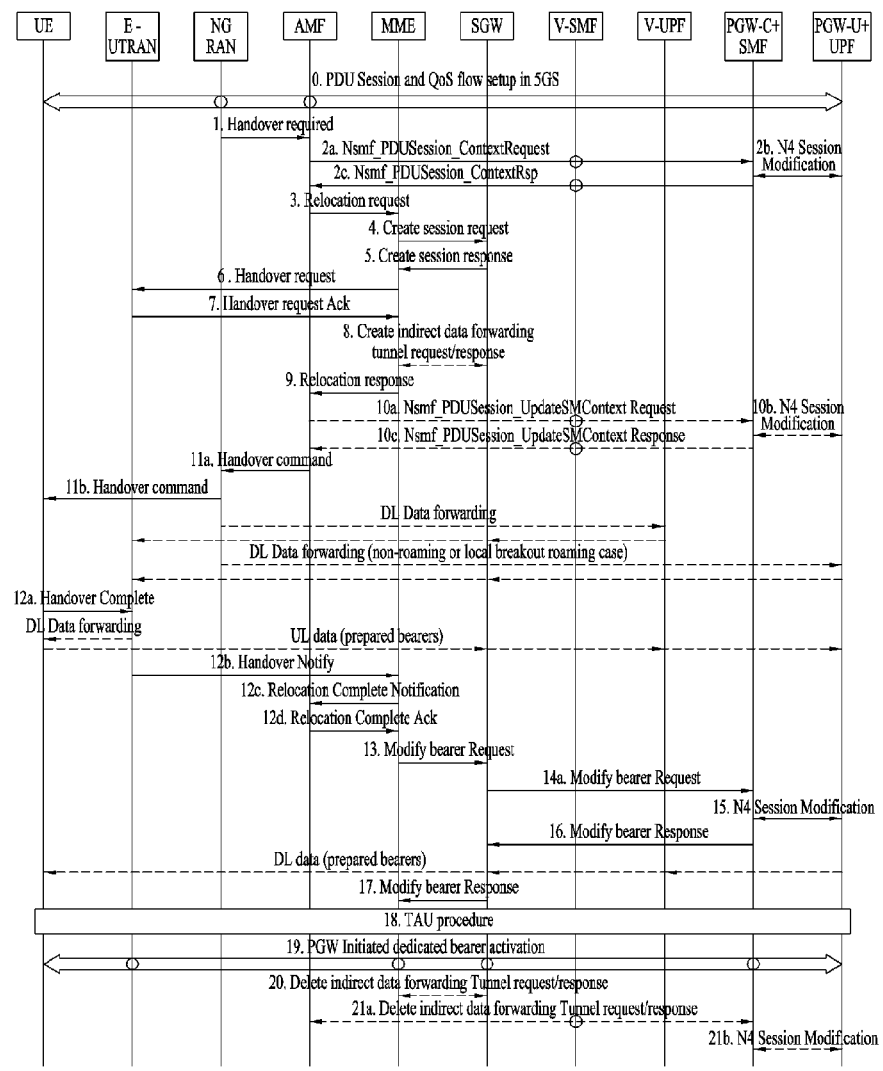
Figure 10:
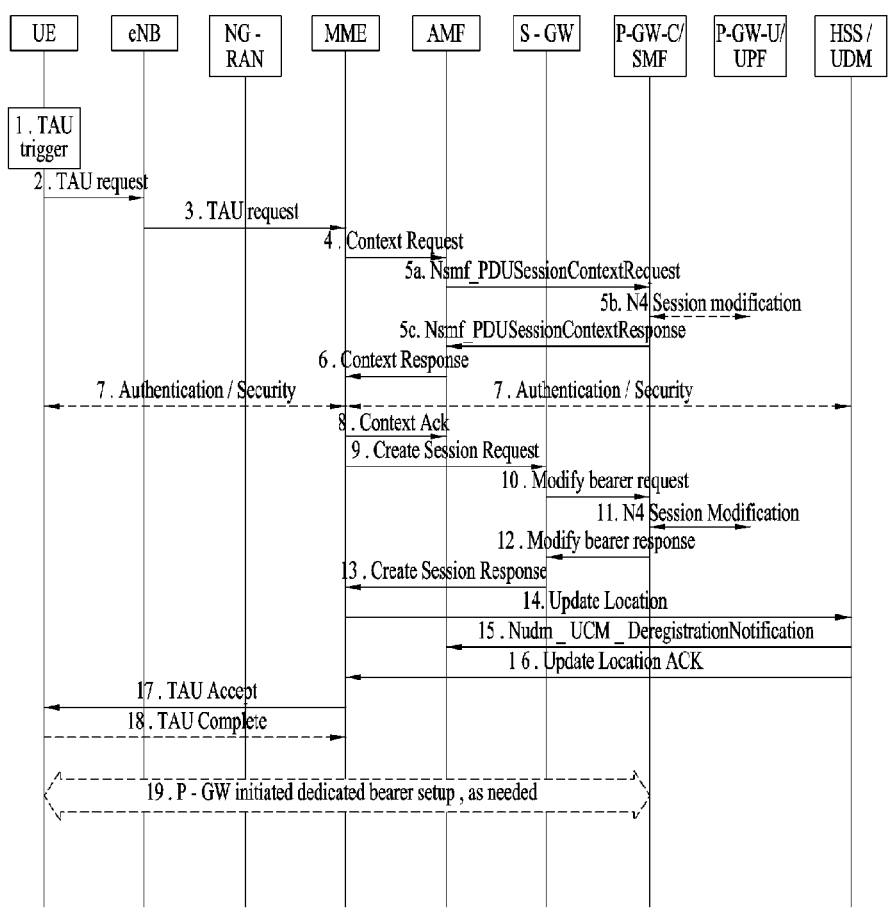

Tables 2 to 8 below are extracted from the documents that were made by the inventors of the present disclosure and submitted to the 3GPP organization. In Tables 2 to 8, FIG. 4.11.1.2.1-1 and FIG. 4.11.1.3.2-1 are illustrated in FIGS. 9 and 10, respectively.

TABLE 2

| 3GPP TSG-SA WG2 Meeting #128BIS<br>Aug. 20-24, 2018, Sophia Antipolis, France<br>(was S2-18xxxx) | | S2-18xxxx |
|---|---|---|
| | | CR-Form-vtt.2 |
| CHANGE REQUEST | | |
| 23.502 CR xxxx rev - Current version: 15.2.0 | | |
| For HELP on using this form: comprehensive instructions can be found at http://www.3gpp.org/Change-Requests. | | |
| Proposed change affects: UICC apps [ ] ME [ ] Radio Access Network [ ] Core Network [X] | | |
| Title: | Clarification on N26 based interworking procedures | |
| Source to WG: | LG Electronics | |
| Source to TSG: | SA WG2 | |
| Work item code: | 5GS_Ph1 | Date: 2018 Jul. 23, |
| Category: | F | Release: Rel-15 |
| | Use one of the following categories:<br>  F (correction)<br>  A (mirror corresponding to a change in an earlier release)<br>  B (addition of feature),<br>  C (functional modification of feature)<br>  D (editorial modification)<br>Detailed explanations of the above categories can be found in 3GPP TR 21.900. | Use one of the following releases:<br>  Rel-8 (Release 8)<br>  Rel-9 (Release 9)<br>  Rel-10 (Release 10)<br>  Rel-11 (Release 11)<br>  Rel-12 (Release 12)<br>  Rel-13 (Release 13)<br>  Rel-14 (Release 14)<br>  Rel-15 (Release 15)<br>  Rel-16 (Release 16) |
| Reason for change: | As described in §4.11.1.4.1 EPS bearer ID allocation, there may be the case that EBI(s) is NOT allocated for some PDU Session(s).<br>  2. . . .<br>    If the PGW-C + SMF (or H-SMF in case of home-routed roaming) serves multiple PDU sessions for the same DNN but different S-NSSAIs for a UE then the SMF shall only request EBIs for PDU sessions served by a common UPF (PSA). In case different UPF (PSA) are serving those PDU sessions, then the SMF chooses one of the UPF (PSA) for this determination based on operator policy.<br>    . . .<br>  3.     [Conditional] If the AMF has no available EBIs, the AMF may revoke an EBI that was assigned to Qos flow(s) based on the ARP(s) and S-NSSAI stored during PDU Session establishment, EBIs information in the UE context and local policies. If an assigned EBI is to be revoked, the AMF invokes Nsmf_PDUSession_UpdateSMContext (EBI(s) to be revoked) to request the related SMF (called "SMF serving the released resources") to release the mapped EPS QoS parameters corresponding to the EBI to be revoked. The AMF stores the association of the assigned EBI, ARP pair to the corresponding PDU Session ID and SMF address.<br>This means that the AMF does not have to request SM context for all PDU Sessions. Therefore, this aspect, i.e. EBI(s) allocated PDU Session, needs to be clarified in the N26 based interworking procedures.<br>In addition, when the UE has not only PDU Session(s) associated with 3GPP | |

TABLE 3

| | |
|---|---|
| | access but also PDU Session(s) associated with non-3GPP access in the same PLMN, only PDU Session(s) associated with 3GPP access should be moved from 5GS to EPS. The related texts are already in §4.11.1.2.1 and §4.11.1.3.2, but, not completely. |
| Summary of change: | §4.11.1.2.1 and §4.11.1.3.2<br>- Clarify that the step for Nsmf_PDUSession_ContextRequest is performed for each PDU Session of the UE when the PDU Session is associated with 3GPP access and has allocated EBI(s). |
| Consequences if not approved: | Incomplete N26 based interworking procedures |
| Clauses affected: | 4.11.1.2.1, 4.11.1.3.2 |
| | Y  N |
| Other specs affected: (show related CRs) Other comments: | X Other core specifications      TS/TR . . . CR . . .<br>X Test specifications             TS/TR . . . CR . . .<br>X O&M Specifications            TS/TR . . . CR . . . |

TABLE 4

**\*\*\*\* Start of 1st Change \*\*\*\***

4.11.1.2.1   5GS to EPS handover using N26 interface

FIG. 4.11.1.2.1-1 describes the handover procedure from 5GS to EPS when N26 is supported.

In the case of handover to a shared EPS network, the source NG-RAN determines a PLMN to be used in the target network as specified by TS 23.501 [2]. The source NG-RAN shall indicate the selected PLMN ID to be used in the target network to the AMF as part of the TAI sent in the HO Required message.

In the case of handover from a shared NG-RAN, the AMF may provide the MME with an indication that the 5GS PLMN is a preferred PLMN at later change of the UE to a 5GS shared networks.

During the handover procedure, as specified in clause 4.9.1.3.1, the source AMF shall reject any PGW-C + SMF initiated N2 request received since handover procedure started and shall include an indication that the request has been temporarily rejected due to handover procedure in progress.

Upon reception of a rejection for an PGW-C + SMF initiated N2 request(s) with an indication that the request has been temporarily rejected due to handover procedure in progress, the PGW-C + SMF behaves as specified in TS 23.401 [13].

FIG. 4.11.1.2.1-1: 5GS to EFS handover for single-registration mode with N26 interface The procedure involves a handover to EPC and setup of default EPS bearer and dedicated bearers for GBR QoS Flows in EPC in steps 1-16 and re-activation, if required, of dedicated EPS bearers for non-GBR QoS Flows in step 17. This procedure can be triggered, for example, due to new radio conditions, load balancing or in the presence of Qos Flow for normal voice or IMS emergency voice, the source NG-RAN node may trigger handover to EPC.

For Ethernet and Unstructured PDU Session Types, the PDN Type non-IP is used, when supported, in EPS. The SMF shall thus set the PDN Type of the EPS Bearer Context to non-IP in these cases. After the handover to EPS, the PDN Connection will have PDN Type non-IP, but it shall be locally associated in UE and SMF to PDU Session Type Ethernet or Unstructured respectively.

In the roaming home routed case, the PGW-C + SMF always provides the EPS Bearer ID and the mapped QoS parameters to UE. The V-SMF caches the EPS Bearer ID and the mapped QoS parameters obtained from H-SMP for this PDU session. This also applies in the case that the HPLMN operates the interworking procedure without N26.

NOTE 1:   The IP address preservation cannot be supported, if PGW-C + SMF in the HPLMN doesn't provide the mapped QoS parameters.

1. NG-RAN decides that the UE should be handed over to the E-UTRAN. If NG-RAN is configured to perform Inter RAT mobility due to IMS voice fallback triggered by QoS flow setup and request to setup QoS flow for IMS voice was received, NG-RAN responds indicating rejection of the QoS flow establishment because of mobility due to fallback for IMS voice via N2 SM information and triggers handover to E-UTRAN. The NG-RAN sends a Handover Required (Target eNB ID, Source to Target Transparent Container, inter system handover indication. Indirect Forwarding Flag) message to the AMF. NG-RAN indicates bearers corresponding to the 5G QoS Flows for data forwarding in Source to Target Transparent Container.
   If the handover is triggered due to Emergency fallback, the NG-RAN may forward the Emergency indication to the target eNB in the Source to Target Transparent Container, and the target eNB allocates radio bearer resources taking received indication into account.
   The Indirect Forwarding Flag indicates the applicability of indirect data forwarding.
2. In the case of HR roaming, the AMF determines from the 'Target eNB Identifier' IE that the type of handover is Handover to E-UTRAN. The AMF selects an MME as described in TS 23.401 [13] clause 4.3.8.3.

TABLE 5

The AMF by using Nsmf_PDUSession_Context Request requests the V-SMF to provide SM Context that also includes the mapped EPS Bearer Contexts. The AMF provides the target MME capability to SMF in the request to allow the V-SMF to determine whether to included EPS Bearer context for non-IP PDN Type or not. For PDU Sessions with PDU Session Type Ethernet or Unstructured, the SMF provides SM Context for non-IP PDN Type.

In the case of non roaming or LBO roaming, the AMF request PGW-C + SMF to provide SM Context by using Nsmf_PDUSession_ContextRequest. The PGW-C + SMF send N4 Session modification to PGW-U + UPF to TABLE 5-continued

| | |
|---|---|
| | establish the CN tunnel for each EPS bearer and provide EPS Bearer Contexts to AMF, as described in step 8 of clause 4.11.1.4.1.<br>This step is performed with all PGW-C + SMFs allocated to the UE for each PDU Session of the UE if the PDU Session is associated with 3GPP access and has allocated EBI(s). |
| NOTE 2: | The AMF knows the MME capability to support non-IP PDN type or not through local configuration. |
| NOTE 3: | In home routed roaming scenario, the UE's SM EPS Contexts are obtained from the V-SMF. |
| 3. | The AMF sends a Forward Relocation Request as in Step 2 in clause 5.5.1.2.2 (SI-based handover, normal) in TS 23.401 [13], with the following modifications and clarifications:<br>- Parameter "Return preferred" may be included. Return preferred is an optional indication by the MME of a preferred return of the UE to the 5GS PLMN at a later access change to a 5GS shared network. An MME may use this information as specified by TS 23.501 [2].<br>- The SGW address and TEID for both the control-plane or EPS bearers in the message are such that target MME selects a new SGW. The AMF includes the Indirect Forwarding Flag received from the source NG-RAN to inform the target MME of the applicability of indirect data forwarding. |
| NOTE 4: | The mapped SM EPS UE Contexts are included for PDU Sessions with and without active UP connections. |
| 4-5. | Step 4 and 4a respectively in clause 5.5.1.2.2 (SI-based handover, normal) in TS 23.401 [13]. |
| 6. | Step 5 (Handover Request) in clause 5.5.1.2.2 (SI-based handover, normal) in TS 23.401 [13] with the following modification:<br>- Handover Request may contain information Handover Restriction List with information about PLMN IDs as specified by TS 23.251 [35], clause 5.2a for eNodeB functions. |
| 7-9. | Step 5a through 7 in clause 5.5.1.2.2 (SI-based handover, normal) in TS 23.401 [13]. |
| 10a. | If indirect data forwarding applies, the AMF sends the Nsmf_PDUSession_UpdateSMContext Request (Serving GW Address(es) and Serving GW DL TEID(s) for data forwarding) to the PGW-C + SMF, for creating indirect data forwarding tunnel. If multiple PGW-C + SMFs serves the UE, the AMF maps the EPS bearers for Data forwarding to the PGW-C + SMF address(es) based on the association between the EPS bearer ID(s) and PDU Session ID(s). In home-routed roaming case, the AMF requests the V-SMF to create indirect forwarding tunnel. |
| 10b. | The PGW-C + SMF may select an intermediate PGW-U + UPF for data forwarding. The PGW-C + SMF maps the EPS bearers for Data forwarding to the 5G QoS flows based on the association between the EPS bearer ID(s) and QFI(s) for the QoS flow(s) in the PGW-C + SMF, and then sends the QFIs, Serving GW Address(es) and TEID(s) for data forwarding to the PGW-U + UPF. If CN Tunnel Info for Data Forwarding is allocated by the PGW-C + SMF, the CN Tunnel Info for Data Forwarding is provided to PGW-U + UPF in this step. The PGW-U + UPF acknowledges by sending a response. If CN Tunnel Info is allocated by the PGW-U + UPF, the CN Tunnel Info is provided to PGW-C + SMF in this response. In home-routed roaming case, the V-SMF selects the V-UPF for data forwarding. |

TABLE 6

| | |
|---|---|
| 10c. | The PGW-C + SMF returns an Nsmf_PDUSession_UpdateSMContext Response (Cause, CN tunnel Info for Data Forwarding, QoS flows for Data Forwarding) for creating indirect data forwarding. Based on the correlation between QFI(s) and Serving GW Address(es) and TEID(s) for data forwarding, the PGW-U + UPF maps the QoS flow(s) into the data forwarding tunnel(s) in EPC. |
| 11. | The AMF sends the Handover Command to the source NG-RAN (Transparent container (radio aspect parameters that the target eNB has set-up in the preparation phase). CN tunnel info for data forwarding per PDU Session, QoS flows for Data Forwarding). The source NG-RAN commands the UE to handover to the target access network by sending the HO Command. The UE correlates the ongoing QoS Flows with the indicated EPS Bearer IDs to be setup in the HO command. The UE locally deletes the PDU Session if the QoS Flow associated with the default QoS rule in the PDU Session does not have an EPS Bearer ID assigned. If the QoS Flow associated with the default QoS rule has an EPS Bearer ID assigned, the UE keeps the PDU Session (PDN connection) and for the remaining QoS Flow(s) that do not have EPS bearer ID(s) assigned, the UE locally deletes the QoS rule(s) and the QoS Flow level QoS parameters if any associated with those Qos Flow(s). The UE deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding", NG-RAN initiate data forwarding via to the PGW-U + UPF based on the CN Tunnel Info for Data Forwarding per PDU Session. Then the PGW-U + UPF maps data received from the data forwarding tunnel(s) in the 5GS to the data forwarding tunnel(s) in EPS, and sends the data to the target eNodeB via the Serving GW. |
| 12-12c. | Step 13 to step 14 from clause 5.5.1.2.2 (SI-based handover, normal) in TS 23.401 [13]. |
| 12d. | The AMF acknowledges MME with Relocation Complete Ack message. A timer in AMF is started to supervise when resources in the in NG-RAN and PGW-C + SMF shall be released. |
| 13. | Step 15 from clause 5.5.1.2.2 (SI-based handover, normal) in TS 23.401 [13]. |
| 14. | Step 16 (Modify Bearer Request) from clause 5.5.1.2.2 (S1-based handover, normal) in TS 23.401 [13] with the following clarification:<br>- The PGW-C + SMF deletes the PDU Session if the QoS Flow associated with the default QoS rule in the PDU Session does not have an EPS Bearer ID assigned. If the QoS Flow associated with the default QoS rule has an EPS Bearer ID assigned, the PGW-C + SMF keeps the PDU Session (PDN connection) and for the remaining QoS Flows that do not have EPS bearer ID(s) assigned, the PGW-C + SMF maintains the PCC rule(s) associated with those QoS Flows. |
| NOTE 5: | The PGW-C + SMF initiating dedicated bearer activation for those maintained PCC rule(s) is described in step 18. |
| NOTE 6: | If the QoS flow is deleted and the default QoS rule contains a Packet Filter Set that allows all UL packets or contains no Packet Filter Set, the IP flows of the deleted QoS rules are mapped to the default EPS bearer. If the default QoS rule contains packet filter(s), the IP flows in the deleted QoS Flow may be interrupted until step 18 of clause 5.5.1.2.2 in TS 23.401 [13]. |

TABLE 6-continued

15. The PGW-C + SMF initiates a N4 Session Modification procedure towards the UPF + PGW-U to update the User Plane path. The PGW-C + SMF releases the resource of the CN tunnel for PDU Session in UPF + PGW-U.
16. Step 16a (Modify Bearer Response) from clause 5.5.1.2.2 (SI-based handover, normal) in TS 23.401 [13]. At this stage the User Plane path is established for the default bearer and the dedicated GBR bearers between the UE, target eNodeB, Serving GW and the PGW-U + UPF. The PGW-C + SMF uses the EPS QoS parameters as assigned for the dedicated EPS GBR bearers during the QoS flow establishment. PGW-C + SMF maps all the other IP flows to the default EPS bearer.
17. Step 17 from clause 5.5.1.2.2 (SI-based handover, normal) in TS 23.401 [13].

TABLE 7

18. The UE initiates a Tracking Area Update procedure as specified in TS 23.401 [13], clause 5.3.3.1 with modifications specified in clause 4.11.1.5.3.
When the old AMF decides not to maintain a UE registration for non-3GPP access anymore, the old AMF then unsubscribes from Subscription Data updates by sending an Nudm_SDM_Unsubscribe service operation to UDM and releases of all the AMF and AN resources related to the UE.
NOTE 7: The behaviour whereby the HSS + UDM cancels location of CN node of the another type, i.e. AMF is similar to HSS behaviour for MME and Gn/Gp SGSN registration (see TS 23.401 [13]). The target AMF of the cancel location by the HSS + UDM is one associated with 3GPP access.
19. The PGW-C + SMF initiates dedicated bearer activation procedure for non-GBR QoS Flows by mapping the parameters of the non-GBR Flows to EPC QoS parameters. This setup may be triggered by the PCRF + PCF, if PCC is deployed. This procedure is specified in TS 23.401 [13], clause 5.4.1. For Ethernet PDU Session Type, using non-IP PDN Type in EPS, this step is not applicable.
20. Step 21 from clause 5.5.1.2.2 (SI-based handover, normal) in TS 23.401 [13].
21. If indirect forwarding was used, then the expiry of the timer at AMF started at step 12c triggers the AMF to invoke Nsmf_PDUSession_UpdateSMContext Request service operation with an indication to release the forwarding tunnels of the V-SMF, in order to release temporary resources used for indirect forwarding that were allocated at step 10. The V-SMF returns Nsmf_PDUSession_UpdateSMContext Response message.
** Start of 2nd Change **

4.11.1.3.2    5GS to EPS Idle mode mobility using N26 interface
In case of network sharing the UE selects the target PLMN ID according to clause 5.18.3 of TS 23.501 [2].
Clause 4.11.1.3.2 covers the case of idle mode mobility from 5GC to EPC. UE performs Tracking Area Update procedure in E-UTRA/EPS when it moves from NG-RAN/5GS to E-UTRA/EPS coverage area.
The procedure involves a Tracking Area Update to EPC and setup of default EPS bearer and dedicated bearers in EPC in steps I-II and re-activation, if required.
FIG. 4.11.1.3.2-1: 5GS to EPS idle mode mobility using N26 interface
The TAU procedure in TS 23.401 [13] is used with the following 5GS interaction:
1. Step 1 from clause 5.3.3.1 (Tracking Area Update procedure with Serving GW change) in TS 23.401 [13].
2. Step 2 from clause 5.3.3.1 (Tracking Area Update procedure with Serving GW change) in TS 23.401 [13] with the modification captured in clause 4.11.1.5.3.
3-4. Steps 3-4 from clause 5.3.3.1 (Tracking Area Update procedure with Serving GW change) in TS 23.401 [13].
5a. The AMF verifies the integrity of the TAU request message and requests the PGW-C + SMF to provide SM Context by using Nsmf_PDUSession_ContextRequest that also includes the mapped EPS Bearer Contexts. The AMF provides the target MME capability to SMF in the request to allow the SMF to determine whether to include EPS Bearer context for non-IP PDN Type or not. This step is performed for each PDU Session ID and its associated SMF ID the AMF has stored during the PDU Session establishment, if the PDU Session is associated with 3GPP access and has allocated EBI(s). In this step, if the AMF correctly validates the UE, then the AMF starts a timer.

TABLE 8

NOTE 1: The AMF knows the MME capability to support non-IP PDN type or not through local configuration.
5b. For Non-roaming or roaming with local breakout scenario, if CN Tunnel Info is allocated by the PGW-U + UPF, the SMF sends N4 Session Modification Request to PGW-U + UPF to establish the tunnel for each EPS bearers, and PGW-U + UPF provides the PGW-U Tunnel Info for each EPS bearers to PGW-C + SMF.
NOTE 2: In home routed roaming case, the CN Tunnel Info for each EPS bearer has been prepared by the PGW-C + SMF and provided to the V-SMF as specified in clause 4.11.1.4.1.
5c. SMF returns mapped EPS bearer contexts, which includes PGW-C control plane tunnel information of the PDN connection corresponding to the PDU session, EBI for each EPS bearer, PGW-U tunnel information for each EPS bearer, and EPS QoS parameters for each EPS bearer. For PDU Sessions with PDU Session Type Ethernet or Unstructured, the SMF provides SM Context for non-IP PDN Type.
6. The AMF responds with a Context Response message carrying mapped MM context (including mapped security context), Return preferred and SM EPS UE Context (default and dedicated GBR bearers) to the MME. If the verification of the integrity protection fails, the AMF returns an appropriate error cause. Return preferred is an optional indication by the AMF of a preferred return of the UE to the 5GS PLMN at a later access change to a 5GS shared network.
7-14. Steps 6-12 from clause 5.3.3.1 (Tracking Area Update procedure with Serving GW change) in TS 23.401 [13] are performed with following addition:
In the step 11, the PGW-C + SMF requests the PGW-U + UPF to establish the tunnel for each EPS bearer by TABLE 8-continued providing SGW-U Tunnel Info, and PGW-U Tunnel Info if the PGW-U Tunnel Info is allocated by the PGW-C + SMF.
15. The UDM invokes Nudm_UEContextManagement_DeregistrationNotification to notify the AMF associated with 3GPP access with reason as 5GS to EPS Mobility. The AMF behavior is described in step 14c of clause 4.2.2.2.
16-18. Steps 17-21 from clause 5.3.3.1 (Tracking Area Update procedure with Serving GW change) in TS 23.401 [13] with the following modification:
The MME may provide the eNodeB with a PLMN list in the Handover Restriction List taking into account the last used 5GS PLMN ID and the Return preferred indication. The Handover Restriction List contains a list of PLMN IDs as specified by TS 23.251 [35] clause 5.2a for eNodeB functions.
The MME may not release the signaling connection with the UE based on the indication received in the step 1 that the UE is moving from 5GC.
19. [conditional] Dedicated bearer setup may be triggered by the PCRF + PCF which may also provide the mapped QoS parameters, if PCC is deployed. This procedure is specified in TS 23.401 [13], clause 5.4.1.
** End of Changes **

Figure 11:
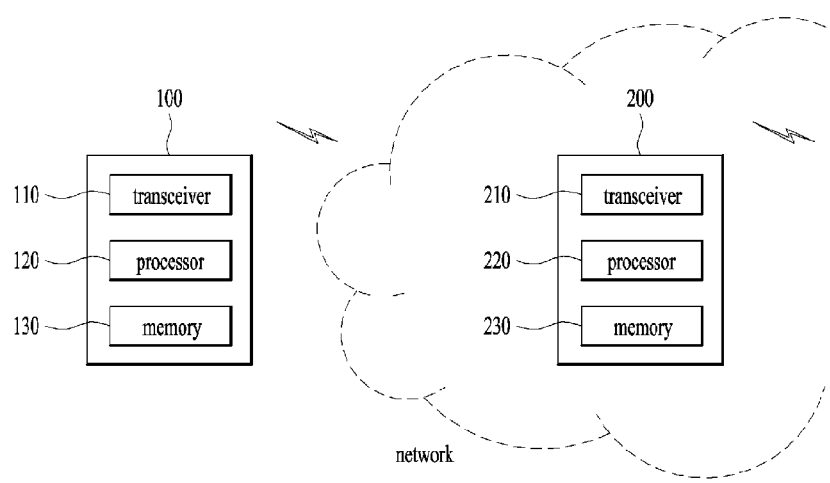
FIG. 11 is a diagram illustrating the configurations of node devices according to embodiments of the present disclosure.

FIG. 11 illustrates the configurations of a UE device and a network node device according to embodiments of the present disclosure.

Referring to FIG. 11, the network node device 200 may include a transceiver 210, a processor 220, and a memory 230. The transceiver 210 may be configured to transmit and receive various signals, data, and information to and from an external device. The network node device 200 may be connected to the external device by wire and/or wirelessly. The processor 220 may be configured to control the overall operations of the network node device 200 and process information exchanged between the network node device 200 and external device. The memory 230 may be configured to store the processed information for a predetermined time and replaced with a component such as a buffer (not shown in the drawing). In addition, the processor 220 may be configured to perform the network node operations proposed in the present disclosure.

Specifically, a processor of an AMF device may be configured to receive a Handover Required message from an NG-RAN through a transceiver, request an SM context to a PGW+SMF, receive the SM context from the PGW+SMF, and control the AMF to transmit a handover command to the NG-RAN. In this case, the SM context request may be for a PDU session related to a 3GPP access among a plurality of PDU sessions.

In addition, a processor of a PGW+SMF device may be configured to receive a request for an SM context from an AMF and transmit the SM context to the AMF. In this case, the SM context request may be for a PDU session related to a 3GPP access among a plurality of PDU sessions.

Continuing to refer to FIG. 11, the UE device 100 according to the present disclosure may include a transceiver 110, a processor 120, and a memory 130. The transceiver 110 may be configured to transmit and receive various signals, data, and information to and from an external device. The UE device 100 may be connected to the external device by wire and/or wirelessly. The processor 120 may be configured to control the overall operations of the UE device 100 and process information exchanged between the UE device 100 and the external device. The memory 130 may be configured to store the processed information for a predetermined time and replaced with a component such as a buffer (not shown in the drawing). In addition, the processor 120 may be configured to perform the UE operations proposed in the present disclosure.

Regarding the configurations of the UE device 100 and the network device 200, the above-described various embodiments of the present disclosure may be applied independently, or two or more embodiments of the present disclosure may be applied at the same time. Redundant description has been omitted for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:
1. A method of transmitting and receiving, by an access and mobility management function (AMF), a signal related to handover of a user equipment (UE) from a fifth generation system (5GS) to an evolved packet system (EPS) in a wireless communication system, the method comprising:

receiving, by the AMF, a Handover Required message from a next generation radio access network (NG-RAN);

requesting, by the AMF, a session management (SM) context to a packet data network gateway+session management function (PGW+SMF);

receiving the SM context from the PGW+SMF; and transmitting, by the AMF, a handover command to the NG-RAN, wherein the SM context request is for a protocol data unit (PDU) session related to a third generation partnership project (3GPP) access among a plurality of PDU sessions, wherein the AMF refrains from transmitting a SM context request for any non-3GPP sessions that the UE has, and wherein the PDU session has an allocated EPS bearer ID (EBI).

2. The method of claim 1, wherein the SM context request includes a PDU session ID for the PDU session related to the 3GPP access.

3. The method of claim 2, wherein the PDU session ID is reference information assigned by an SMF during generation of the SM context for the PDU session to identify the PDU session or the SM context.

4. The method of claim 2, wherein the received SM context is for the PDU session corresponding to the PDU session ID.

5. The method of claim 1, wherein the plurality of PDU sessions includes one or more PDU sessions related to 3GPP access and zero or more PDU sessions related to non-3GPP access.

6. The method of claim 1, wherein a type of the handover is handover from the 5GS to an evolved universal mobile telecommunications system (UMTS) terrestrial radio access network (E-UTRAN).

7. The method of claim 1, wherein the AMF stores access information for each PDU session.

8. The method of claim 1, wherein the PGW+SMF manages both a 3GPP access PDU session and a non-3GPP access PDU session.

9. The method of claim 1, wherein an access type in the SM context request is set to the 3GPP access.

10. The method of claim 1, wherein only the PDU session related to the 3GPP access is handed over to a target access network based on the handover command.

11. The method of claim 10, wherein the target access network is an evolved universal mobile telecommunications system (UMTS) terrestrial radio access network (E-UTRAN).

12. An access and mobility management function (AMF) device for transmitting and receiving a signal related to handover of a user equipment (UE) from a fifth generation system (5GS) to an evolved packet system (EPS) in a wireless communication system, the AMF device comprising:

a transceiver; and a processor, wherein the processor is configured to:

receive a Handover Required message from a next generation radio access network (NG-RAN) through the transceiver;

request a session management (SM) context to a packet data network gateway+session management function (PGW+SMF);

receive the SM context from the PGW+SMF; and transmit a handover command to the NG-RAN, wherein the SM context request is for a protocol data unit (PDU) session related to a third generation partnership project (3GPP) access among a plurality of PDU sessions, wherein the AMF refrains from transmitting a SM context request for any non-3GPP sessions that the UE has, and wherein the PDU session has an allocated EPS bearer ID (EBI).

* * * * *